United States Patent [19]

Ghose et al.

[11] Patent Number: 4,979,063
[45] Date of Patent: Dec. 18, 1990

[54] DESIGN FOR AN ACTUATOR ARM FOR A DISC DRIVE

[75] Inventors: Sanjoy Ghose, Santa Cruz; Ramgopal Battu, Los Angeles County; Iraj Jabbari, Santa Clara County, all of Calif.

[73] Assignee: Seagate Technology, Inc., Scotts Valley, Calif.

[21] Appl. No.: 345,434

[22] Filed: May 1, 1989

Related U.S. Application Data

[63] Continuation-in-part of Ser. No. 263,997, Oct. 25, 1988, abandoned, which is a continuation of Ser. No. 914,690, Oct. 2, 1986, abandoned.

[51] Int. Cl.$^5$ ............................................. G11B 5/55
[52] U.S. Cl. ................................................. 360/106
[58] Field of Search ............ 360/104, 105, 106, 97.01, 360/99.01

[56] References Cited

U.S. PATENT DOCUMENTS

| | | |
|---|---|---|
| 4,556,924 | 12/1985 | Quist, Jr. et al. ............ 360/106 |
| 4,631,611 | 12/1986 | Schneider ..................... 360/106 |
| 4,745,504 | 5/1988 | Foote ............................ 360/166 |

FOREIGN PATENT DOCUMENTS

0124066 7/1984 Japan ..................................... 360/106

Primary Examiner—David J. Severin
Attorney, Agent, or Firm—Flehr, Hohbach, Test, Albritton & Herbert

[57] ABSTRACT

A pivot bearing assembly for a disc drive including the combination of a bearing surrounded on one side by a wishbone-shaped end of the actuator arm, and on the other side by a biasing spring metal strip whose ends are tightly attached to the split ends of the wishbone of the actuator arm. When the arm assembly is mounted in the disc drive, the bearing is mounted on its center of rotation, with the spring tensile force biasing the head of the actuator arm against the spindle of the stepper motor. By providing the distal end of the actuator arm with a gear sector having gear teeth on its face which mesh with a pinion on the motor shaft of the stepper motor, rotation of the motor shaft across the face of the gear sector causes movement of the actuator arm and with it the flexure and transducer across the surface of the disc. The head arm supporting the flexure and transducer extends from the side of the actuator drive arm at a point near the stepper motor driven end of the drive arm, reducing head arm length.

5 Claims, 3 Drawing Sheets

DESIGN FOR AN ACTUATOR ARM FOR A DISC DRIVE

This application is a continuation-in-part of U.S. Application Ser. No. 263,997 filed Oct. 25, 1988, now abandoned, which is a continuation of U.S. Application Ser. No. 914,690 filed Oct. 2, 1986, now abandoned.

FIELD OF THE INVENTION

This invention is directed generally to the field of disc drives incorporating rotary actuators, and more particularly to an improved pivot support mechanism for the actuator arm.

BACKGROUND OF THE INVENTION

Disc drives record and reproduce information stored on concentric circular tracks on magnetic discs. The tracks are written and read by magnetic heads which must be accurately positioned over a selected one of the tracks on the surface of the disc. Various methods have been used to position the heads and hold them precisely located over the selected track. The two commonly-used types of head positioning mechanisms are linear and rotary head actuators.

In the second type, which this invention is directed to, the head moves generally radially in order to access the various disc tracks. However, the movement is usually along a segment of a circle. The commonly-known form of rotary actuator includes a head/arm flexure for supporting the transducer, the transducer or read/write head extending out from a pivot to the track position to be accessed. Extending from the pivot to essentially form a V-shaped actuator arm assembly with the head/arm is an actuator arm, which in turn is coupled to a stepper motor. As the stepper motor rotates, the actuator arm assembly rotates about the pivot point, moving the transducer from track to track. Obviously, a highly stable pivot at the end of the actuator arm distal from the stepper motor is absolutely required, so that with the wear caused by time and repeated usage, and the fluctuations caused by changes in operating temperature, the preset position of the transducer relative to a target track and its long term stability over that track is not easily altered. The pivot mechanism must offer high precision, reliability and low mechanical resistance. Further, in the present price-conscious competition in the disc drive market, the pivot mechanism must be easily constructed and assembled.

The pivot mechanisms in the prior art generally include a shaft supporting the juncture of the two arms, i.e. the actuator drive arm and the head arm, two ball bearings, and the required spring retainers preload springs and attachment means coupling the separate elements to the arms.

SUMMARY OF THE INVENTION

It is an objective of the present invention to provide an actuator arm bearing support which is an improvement over the prior art as presently known.

It is a further objective of the present invention to provide an actuator arm pivot mechanism which is straightforward in design, easy to assemble, and incorporates a minimal parts count.

It is a further objective of the present invention to provide a simple and highly-reliable pivot mechanism which still offers the required precision and reliablity in positioning the transducer over a desired track on the disc which is provided by other more complex pivot mechanisms.

The above and other objectives of this invention are achieved by providing as the pivot bearing assembly the combination of a bearing surrounded on one side by a wishbone-shaped end of the actuator arm, and on the other side by a biasing spring metal strip whose ends are tightly attached to the split ends of the wishbone of the actuator arm. When the arm assembly is mounted in the disc drive, the bearing is mounted on its center of rotation, with the spring tensile force biasing the head of the actuator arm against the spindle of the stepper motor. By providing the distal end of the actuator arm with a gear sector having gear teeth on its face which mesh with a pinion on the motor shaft of the stepper motor, rotation of the motor shaft across the face of the gear sector causes movement of the actuator arm and with it the flexure and transducer across the surface of the disc. The head arm supporting the flexure and transducer extends from the side of the actuator drive arm at a point near the stepper motor driven end of the drive arm, reducing head arm length.

By adopting this embodiment, the normal bearing pivot assembly is eliminated. A low-cost, easily-assembled disc drive assembly is provided utilizing a minimum number of parts. Minimal off-tracking will occur with shock because of the spring force maintaining the engagement between the actuator arm and the stepper motor. Tooth wear of the gear sector or pinion will cause minimal off-track radially, since the wear causes mostly tangential motion of the head on the track in a further advantageous feature of this invention, the top portion of the spring strip is bent slightly to press against the top of the bearing which is the pivot center for the actuator arm. This imparts a downward force along the length of the actuator arm so that the arm is pitched slightly downward toward the base at the distal end of the actuator arm. This prevents disengagement of the actuator arm from the stepper motor drive shaft with shocks.

The features and advantages of this invention will be better understood with reference to the following figures:

BRIEF DESCRIPTION OF THE DRAWINGS

The features and advantages of this invention will be better understood with reference to the following figures.

DETAILED DESCRIPTION OF A PREFERRED EMBODIMENT

Figure 1A:
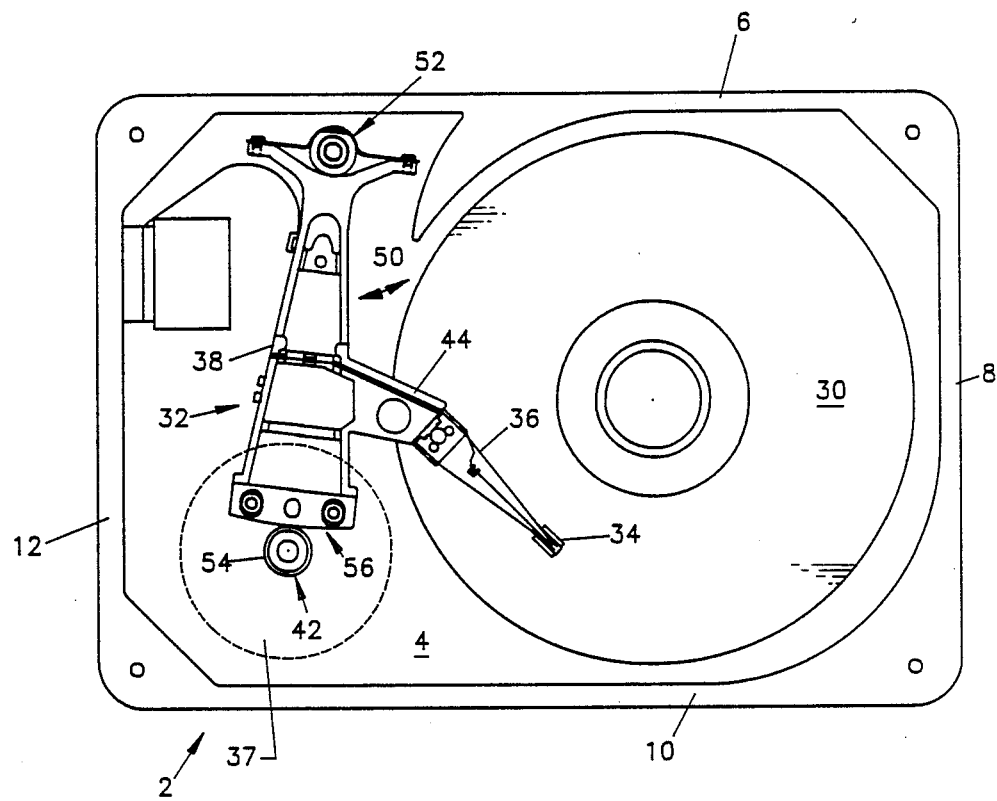
FIG. 1A is a top plan view of the disc drive, a disc drive base casting and actuator arm designed in accordance with this invention.
Figure 1B:
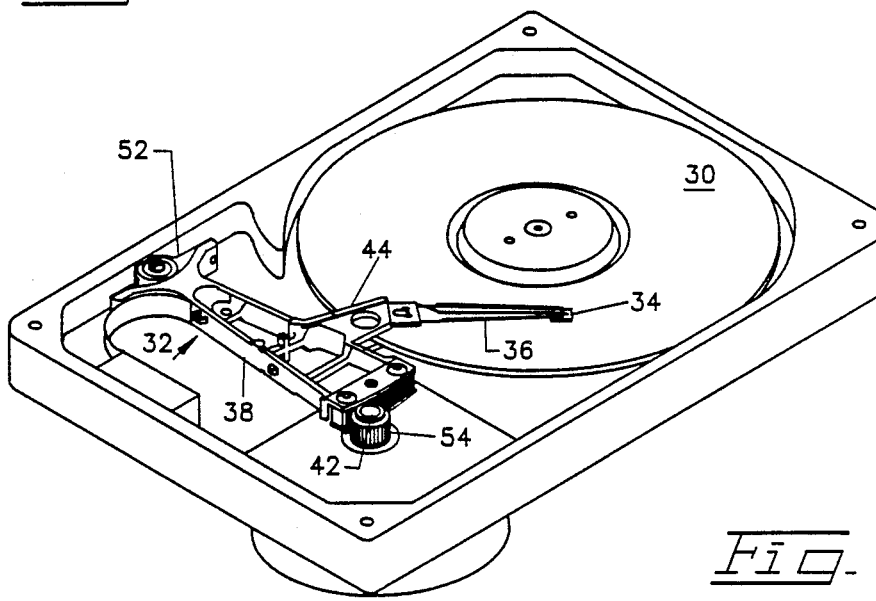
FIG. 1B is a perspective view of the disk drive.
Figure 3:
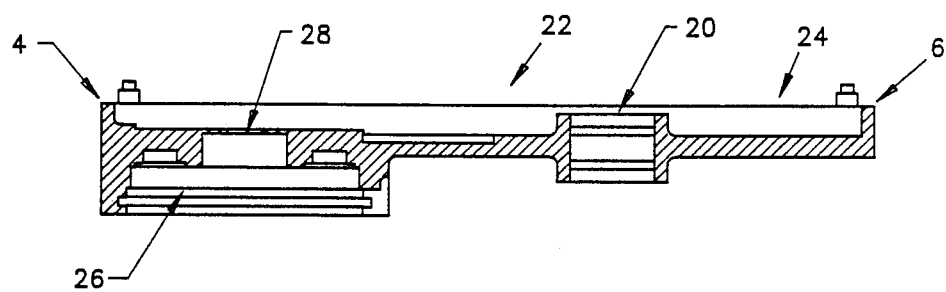
FIG. 3 is a vertical sectional view of the base casting of the present invention.

Referring to FIG. 1, the major components of a disc drive designed in accordance with the present invention are illustrated, including a housing 2 having a baseplate 4 and upright walls 6, 8, 10 and 12 which define the enclosed region where the rotating disc and actuator arm are positioned. The integral base casting for the base of this disc drive is shown in greater detail in FIG. 3. The base casting includes a spindle motor mounting region 20, where the spindle motor is located and supported for rotating the disc on which the data is stored. The disc rotates in the open area indicated generally at 22, 24 where sufficient free space is defined to mount one or more discs for rotation while leaving an area in which air may flow freely over the surface of the disc.

Adjacent one of the sidewalls 4, an area 26 is defined where a stepper motor is located. The drive shaft of the stepper motor extends up through the drive shaft opening 28 to contact the distal portion of the actuator arm which will be described with respect to FIG. 1. The step-by-step rotation of the stepper motor will cause movement of the actuator arm, the arm carrying a transducer which is thereby selectively positioned over the surface of the disc in the open region 22 to access the data on the surface of the rotating disc.

The above-described feature of the invention will be more apparent from FIG. 1 which shows a top plan view of the storage disc 30 mounted within the housing 2 for rotation about the spindle 31. The actuator arm 32 which includes drive arm 38 and transducer support arm 44 supports the transducer 34 at the end of flexure 36. The arm 32 moves in response to selective stepwise rotation of the stepper motor 37. The actuator arm assembly 32, and specifically drive arm portion 38 extends from a pivot bearing mounting 40 to the drive shaft 42 of the stepper motor 37. The drive arm 38 supports, at one side thereof, extending toward the rotating disc, transducer support arm 44 to which the flexure 36 and transducer 34 are attached. As the drive arm 38 moves back and forth along the path generally described by the arrow 50, the transducer 34 is moved from track to track to access the defined data location.

The drive arm 38 pivots around a bearing generally indicated at 52 which will be described in detail below with reference to FIG. 4. The movement of the drive arm 38 occurs in response to rotation of the stepper motor 37 which is mounted beneath the baseplate 4. The drive shaft 42 of the stepper motor 37 extends up through the baseplate 4. The motor drive shaft 26 has a pinion 54 machined thereon to mesh with gear teeth of rack 56 supported on the end of the actuator drive arm 38. Rotation of the shaft 42 causes the arm 38 to rotate generally along the radial path indicated by arrow 50 about the bearing pivot point 52 to move the transducer head 34 from track to track.

Figure 2:
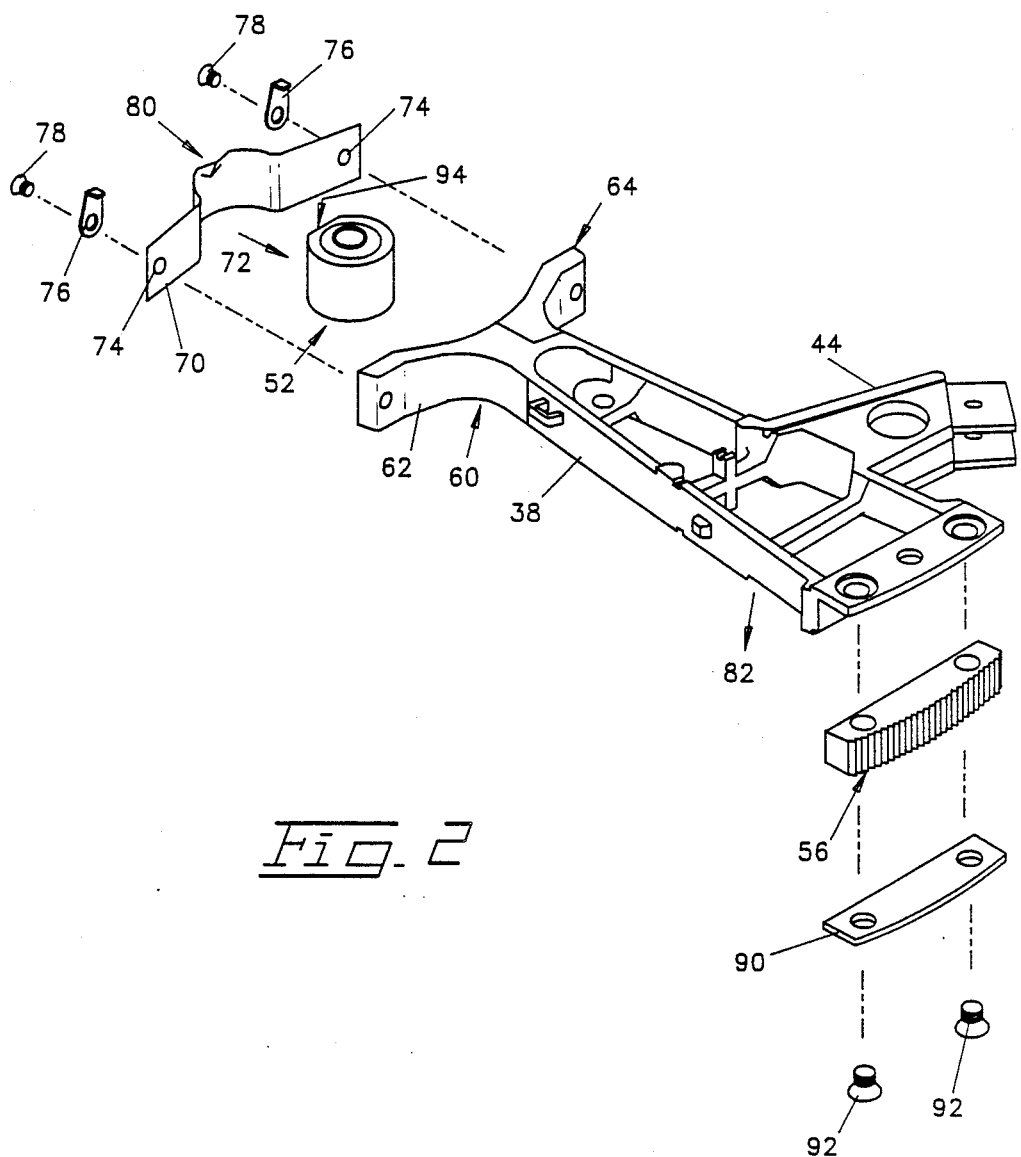
FIG. 2 is an exploded view of the essential elements of the actuator arm of the present invention.

The details of the actuator arm including drive arm portion 38 and head arm portion 44 appear more clearly in FIG. 2. As shown therein, the actuator arm is made of a lightweight metal or synthetic material, chosen so that the arm is flexible along its long axis, but provides significant strength against any rotation about its longest axis. The arm terminates in a general wishbone shape including arms 62, 64 which extend substantially perpendicular to the major axis of the arm and support the bearing spring 70. The arm 38 in a preferred embodiment is bimetallic, being formed of a combination, in a preferred embodiment, of aluminum for the major section 60 including one of the terminating arms 62, and invar or stainless steel for the other strip spring support arm 64. In this way, the metals are chosen so that the length of one side will grow or diminish faster than the other, causing a slight twisting effect of the arm about the axis of bearing 52 and along path 50, so that the thermal effect on the arm is approximately the same as the growth or diminution of the size of the rotating magnetic disc with temperature.

As has been explained above, the actuator arm 32 and especially drive arm portion 38 is supported at one end and rotates about a bearing 52. The bearing itself is supported from the base 4 as will be described in detail with respect to FIG. 4A, and comprises a pair of compliant bearings 53, 54 which are preloaded inward essentially along the lines of force 55, 56 shown. The objective is to crease a very long effective axis. The bearing is preloaded by use of a screw 57. The use of this bearing design allows for possible misalignment of the rack 56 at the driven end of arm 32, and pinion 54 on stepper motor shaft 42. That is, the bearings are loaded on one side 58, and the other bottom side 59 is used for registration by resting on a shoulder 60 of the base casting 4 so that the alignment of the bearing 52 on the base casting 4 is always accurately defined.

The strip spring 70 loads the actuator arm 38, 44 in the direction of the arrow 72 (FIG. 2) so that the gear sector face 56 is pressed tightly against the pinion 54 at all times. Small attachment holes 74 in the strip spring 70 together with clamps 76 and screws 78 attach the strip spring 70 tightly to the extended arms 62, 64 of the wishbone on the back of the actuator arm 38. The top portion 80 of the strip spring 70 is notched or beveled forward toward the actuator arm 38. In this way, a torque effect is provided along the long axis of the actuator arm 38 forcing the actuator arm slightly down toward the base 2 in the direction of the arrow 82 shown in FIG. 2. Thus, the actuator arm is preloaded against the pinion 56 by strip spring 70, and will stay down against the pinion and will not unload or release from the pinion even in the event of major shock being applied to the disc drive, regardless of the direction of the shock.

The assembly of the actuator arm as a whole is easily accomplished as shown in FIG. 2 by providing the rack 56 as a separate element to be screwed to the driven end of the driven arm portion 38 of the actuator arm using support plate 90, and screws 92.

The flexible strip 70 is fastened by the screws 78 to the ends of the arms 62, 64 at the supported end of the actuator arm structure. The spring is fastened tightly to the arm with the curved portion of the spring fastened tightly against the rear surface of the bearing 52, the bent portion 80 pressed against the beveled surface 94 of the bearing so that the spring force is exerted strongly along the axis of the actuator arm to press the pinion against the rack. The gear sector teeth 56 constantly remain in tight coupling transmission arrangement with the pinion 54 so that even with wear or shock, a tight connection continues to exist.

Figures 4A, 4B:
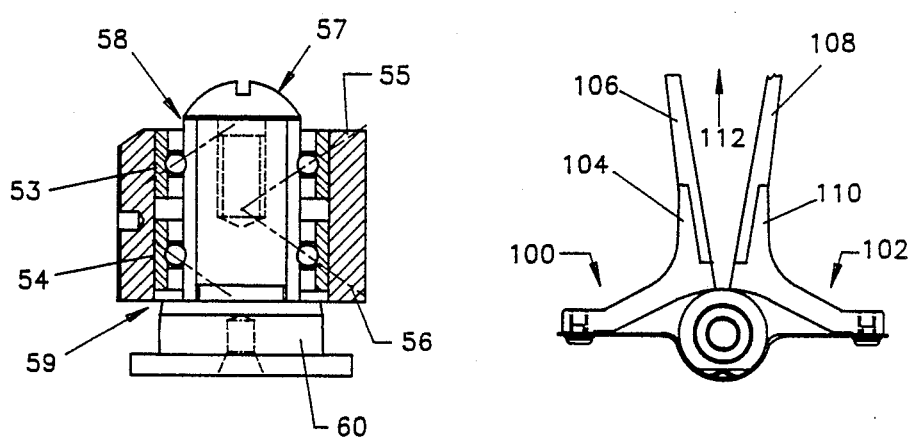
FIG. 4A is a view in section of the bearing housing of the present invention.
FIG. 4B is a plan view of an alternative embodiment of the actuator arm support.

The range of travel of the actuator arm is limited by the crash stop 81 shown in FIG. 4B. The stop comprises a plastic insert 82 with an opening for screw 83, and a metal cover 84 which is also held in place by screw 83 which prevents undue flexing of the plastic insert 81. An upright pin 85 on the plastic piece 82 contacts the sides of arm 38 to limit the travel of the arm.

As an alternative to the arm structure shown in FIG. 2, the structure shown in FIG. 4B may be adopted. In this approach, the actuator arm assembly terminates in two separate arms 100, 102, each formed of bimetallic portions 104, 106 forming one arm, and 108, 110 forming the other. The use of this approach allows for an even more flexible actuator arm which expresses considerable force along the axis 112 which runs the length of the actuator arm while providing the use of bimetallic construction to accomplish the goal of temperature compensation.

Other alternatives to the present invention may become apparent to a person of skill in the art who studies the present invention disclosure. Therefore, the scope of the present invention is to be limited only by the following claims.

What is claimed is:

1. In a disc drive comprising a base casting and upright sidewalls defining a data storage device housing, a constantly rotating disc supported on a spindle motor for constant rotation and having data stored in addressable locations on tracks thereon, and an actuator arm supporting a transducer for accessing said locations on the disc where data can be stored, said actuator arm including an elongated first arm portion extending from a pivot point adjacent one of the upright sidewalls to contact a stepper motor supported from the base casting, and a second arm portion extending from the side of said first arm portion over said rotating disc, rotation of said stepper motor causing movement of said arm to position said transducer relative to said disc, said arm being supported at said pivot point by a bearing assembly mounted on said base casting and a strip spring partially arranged around said bearing assembly and fastened at its ends to said actuator arm to bias an end of said first arm portion distal from said bearing assembly in firm contact with said stepper motor so that rotation of said stepper motor will be accurately reflected in movement of said arm.

2. A disc drive as claimed in claim 1 wherein said strip spring includes first and second ends including said ends to be fastened to said actuator arm, and a curved portion between said ends and surrounding the rear of said bearing assembly and attached to said bearing assembly, whereby said actuator arm is supported between said bearing assembly and said stepper motor without said actuator arm being directly mounted on said bearing assembly.

3. A disc drive as in claim 1 wherein said actuator arm terminates in a wishbone and comprising first and second arms of said wishbone end substantially perpendicular to a long axis of said actuator arm, ends of said first and second arms being tightly connected to the ends of said strip spring to support and bias said actuator arm against said stepper motor.

4. A disc drive as in claim 3 wherein said actuator arm consists primarily of a first type of metal having a first coefficient of thermal expansion and includes an actuator arm segment of a second type of metal having a different coefficient of thermal expansion so that with changes in temperature said actuator arm shifts said transducer generally along or tangent to said tracks.

5. A disc drive as in claim 4 wherein said first metal is aluminum and said second metal is invar.

* * * * *